(12) United States Patent
Ishikawa et al.

(10) Patent No.: US 9,771,996 B2
(45) Date of Patent: Sep. 26, 2017

(54) VIBRATION-DAMPING DEVICE

(71) Applicants: SUMITOMO RIKO COMPANY LIMITED, Komaki-shi, Aichi (JP); TOYOTA JIDOSHA KABUSHIKI KAISHA, Toyota-shi, Aichi (JP)

(72) Inventors: Ryota Ishikawa, Aichi-gun (JP); Noriaki Yoshii, Nagoya (JP); Masaki Yoshida, Komaki (JP)

(73) Assignees: SUMITOMO RIKO COMPANY LIMITED, Komaki (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 224 days.

(21) Appl. No.: 14/647,957

(22) PCT Filed: Jul. 1, 2014

(86) PCT No.: PCT/JP2014/067547
§ 371 (c)(1),
(2) Date: May 28, 2015

(87) PCT Pub. No.: WO2015/012072
PCT Pub. Date: Jan. 29, 2015

(65) Prior Publication Data
US 2015/0345583 A1    Dec. 3, 2015

(30) Foreign Application Priority Data

Jul. 23, 2013    (JP) .................................. 2013-153015

(51) Int. Cl.
*B60K 5/12*    (2006.01)
*F16F 3/087*    (2006.01)
(Continued)

(52) U.S. Cl.
CPC .............. *F16F 3/0873* (2013.01); *B60K 5/12* (2013.01); *B60K 5/1208* (2013.01); (Continued)

(58) Field of Classification Search
CPC .......... F16F 3/0873; F16F 1/371; F16F 1/376; B60K 5/1208; B60K 5/1291; B60K 5/12
(Continued)

(56) References Cited

U.S. PATENT DOCUMENTS 9,541,155 B2 *    1/2017    Okumura ................. F16F 13/08
2013/0112839 A1 *    5/2013    Kato ..................... F16F 13/101
                                                        248/562

(Continued)

FOREIGN PATENT DOCUMENTS

JP    2005-106138 A    4/2005
JP    2006-161973 A    6/2006
JP    2006-177544 A    7/2006

OTHER PUBLICATIONS

Sep. 9, 2014 International Search Report issued in International Application No. PCT/JP2014/067547.

*Primary Examiner* — Nkeisha Smith
(74) *Attorney, Agent, or Firm* — Oliff PLC

(57) ABSTRACT

A vibration-damping device wherein a concave groove is provided on an opposing face of at least one of first and second stopper portions to another. An inner protrusion is formed on a rubber buffer layer overlapped with the opposing face so as to be inserted into the concave groove, and both sides of the inner protrusion in a lengthwise direction of the concave groove are free end faces. An outer protrusion is formed at a formation part of the inner protrusion on the rubber buffer layer so as to protrude outward from the concave groove A displacement regulating portion with a lower surface height than that of a distal end face of the outer protrusion is provided on the rubber buffer layer covering an (Continued)

area of the opposing face located away from the concave groove to both sides in a widthwise direction.

11 Claims, 10 Drawing Sheets

(51) Int. Cl.
 *F16F 1/371* (2006.01)
 *F16F 1/376* (2006.01)
(52) U.S. Cl.
 CPC ............ *B60K 5/1291* (2013.01); *F16F 1/371* (2013.01); *F16F 1/376* (2013.01)
(58) Field of Classification Search
 USPC .......................................................... 248/634
 See application file for complete search history.

(56) References Cited

U.S. PATENT DOCUMENTS

2016/0238102 A1\* 8/2016 Goto ..................... B60K 5/1208
2016/0341275 A1\* 11/2016 Kaneko ................ B60K 5/1208

\* cited by examiner

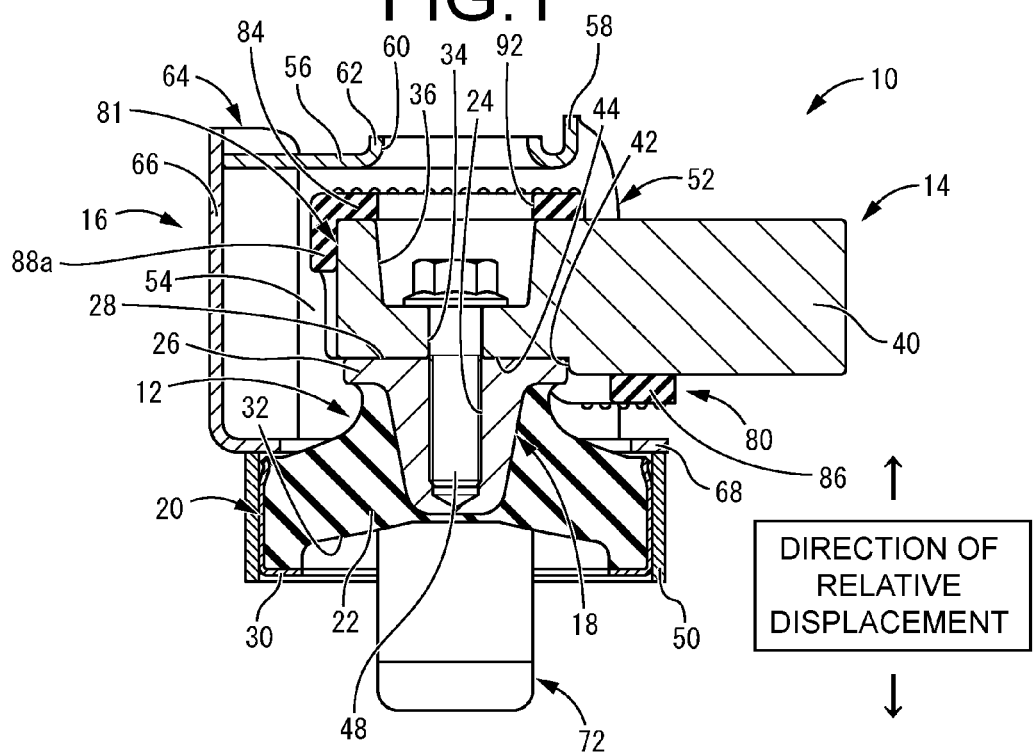
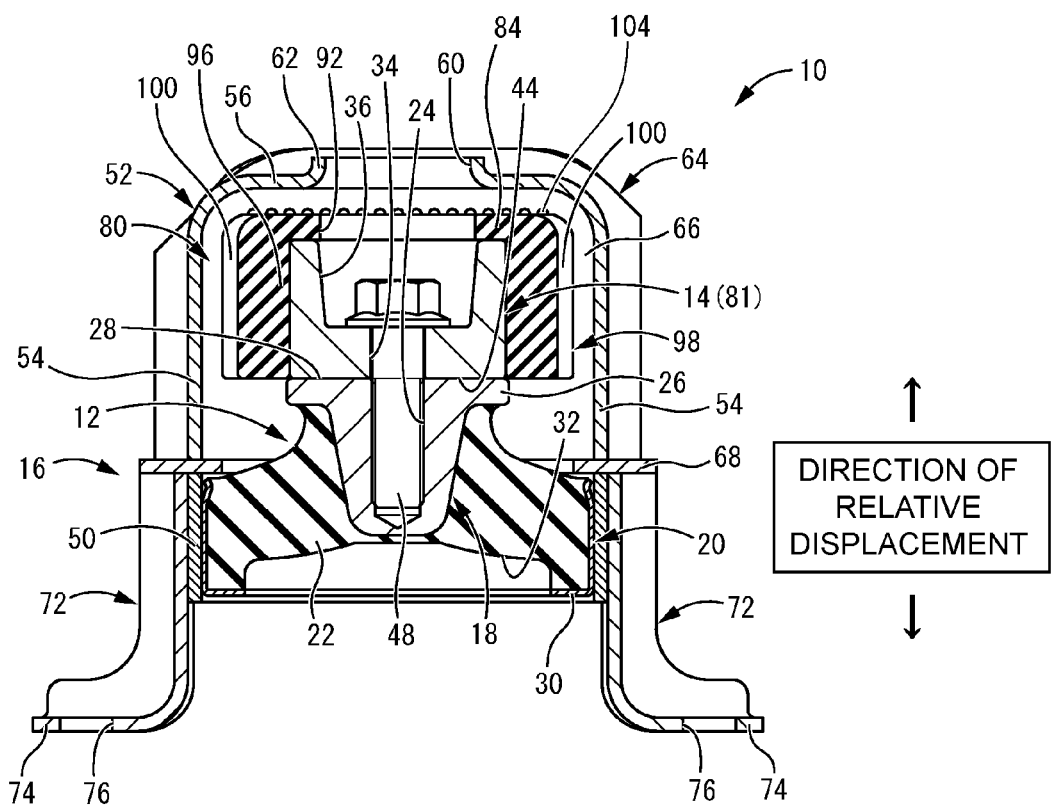

VIBRATION-DAMPING DEVICE

TECHNICAL FIELD

The present invention relates to a vibration-damping device to be used for an automobile engine mount and the like.

BACKGROUND ART

Conventionally, there has been known a vibration-damping device, as a type of vibration-damping device to be interposed between members constituting a vibration transmission system, having a first mounting member and a second mounting member connected by a main rubber elastic body. Engine mounts, body mounts, suspension supports or vibration damping bushes for motor vehicles, for example, are such devices.

In such a vibration-damping device, a stopper mechanism is adopted to restrict relative displacement between the first mounting member and the second mounting member for the purpose of limiting the amount of elastic deformation of the main rubber elastic body and relative displacement between the members at an excessive load input. Such a stopper mechanism is generally configured by providing first and second stopper portions arranged face to face in the direction of relative displacement between the first and second mounting members so as to abut against each other via a rubber buffer layer.

Meanwhile, the stopper mechanism is required to have a buffer function to alleviate the shock at the time of contact between the first and second stopper portions as well as a displacement limiting function that reliably controls relative displacement between the first and second stopper portions. As to the former, it is effective to make the rubber buffer with a larger volume to let it exert soft spring characteristics. So, it has conventionally been treated by thickening the rubber buffer layer, providing concaves and convexes, and setting the rubber hardness low enough.

However, such a treatment had a problem of lowering the reliability of the displacement limiting function of the latter, making it difficult to get both functions at the same time. In addition, since the size of the space that can be set between the opposing faces of the first and second stopper portions where the rubber buffer is arranged is limited by the relation with other members and the like, it was sometimes difficult by itself to set enough thickness for the rubber buffer layer.

In order to deal with this kind of problem, the present applicant previously proposed a structure where the thickness dimension of the rubber buffer layer is made larger by providing a concave recess at a position facing the stopper portion in Japanese Unexamined Patent Publication No. JP-A-2005-106138 (Patent Document 1). However, although such a structure is effective in setting the thickness dimension of the rubber buffer layer substantially large enough while maintaining the durability thereof, if the rubber buffer layer has a Poisson ratio of about 1/2, its lowered spring constant requires an improvement in the buffer function in some cases.

BACKGROUND ART DOCUMENT

Patent Document

Patent Document 1: JP-A-2005-106138

SUMMARY OF THE INVENTION

Problem the Invention Attempts to Solve

The present invention has been developed in view of the above-described matters as the background, and it is an object of the present invention to provide a vibration-damping device with a novel structure where a high buffer function and a high displacement limiting function are both achieved at the same time and either of these functions can be carried out stably.

Means for Solving the Problem

A first aspect of the present invention provides a vibration-damping device including: first and second mounting members connected to each other by a main rubber elastic body; and first and second stopper portions arranged opposite to each other in a direction of relative displacement of the first and second mounting members while abutting against each other via a rubber buffer layer, the vibration-damping device being characterized in that: a concave groove is provided on an opposing face of at least one of the first and second stopper portions to another; an inner protrusion is formed on the rubber buffer layer overlapped with the opposing face so as to be inserted into the concave groove, and both sides of the inner protrusion in a lengthwise direction of the concave groove are free end faces; an outer protrusion is formed at a formation part of the inner protrusion on the rubber buffer layer so as to protrude outward from the concave groove; and a displacement regulating portion with a lower surface height than that of a distal end face of the outer protrusion is provided on the rubber buffer layer which covers an area of the opposing face located away from the concave groove to both sides in a widthwise direction.

In the vibration-damping device with the structure according to the present aspect, by adopting a combination of "the concave groove in the stopper portion" and "the specific inner protrusion, outer protrusion and displacement regulating portion in the rubber buffer layer," two major functions of "buffer function" and "displacement limiting function" could be assigned each role to achieve both effects at the same time in the stopper mechanism whereby relative displacement between the first and second mounting members is controlled in a buffered manner.

That is, as to the "buffer function," an excellent buffer effect could be made to work due to the low spring action within a limited space between the opposing faces of the first and second stopper portions by means of "effectively ensuring the volume or thickness of the rubber buffer layer by the inner protrusion that gets into the concave groove of the stopper portion and the outer protrusion that protrudes out from the concave groove," and by means of "ensuring the degree of freedom for elastic deformation using the end faces on both sides of the inner protrusion in the lengthwise direction of the concave groove as a free surface."

Meanwhile, as to the "displacement limiting function," if the amount of relative displacement between the first and second mounting members gets larger to more than offset the shock absorbing effect based on the abutment of the outer protrusion described above that exerts the buffer function, a reliable displacement limiting function could be made to work based on the abutting action between the first and second stopper portions across the displacement regulating portion by means of providing a thin-walled displacement limiting function section on the rubber buffer layer that covers the area outside the concave groove of the stopper portion.

In addition, the vibration-damping device of the present aspect also has a design advantage that the buffer effect and displacement limiting function can each be adjusted efficiently by means of dividing the functions between the inner and outer protrusions that mainly exhibit buffer functions and the rubber buffer layer that mainly exhibits the displacement limiting function and modifying the size, shape and the like of these inner and outer protrusions as well as rubber buffer layer as appropriate.

A second aspect of the present invention provides the vibration-damping device according to the first aspect, wherein the rubber buffer layer is overlapped with the at least one of the first and second stopper portions in a non-adhesive manner at least at the formation part of the inner protrusion.

According to the present aspect, deformation restraining forces of the inner protrusion due to the stopper portion are reduced to lower the spring action of the inner protrusion and enhance the durability thereof, which can result in the improved buffer function of the outer protrusion based on its abutting action.

A third aspect of the present invention provides the vibration-damping device according to the first or second aspect, wherein the inner protrusion abuts against an inner face of the concave groove.

According to the present aspect, when the buffer function is enabled based on the abutment of the outer protrusion, a striking noise or impact caused by the inner protrusion hitting the inner face of the concave groove can be minimized, while any marked nonlinearity of the load-deflection characteristics caused by the inner protrusion hitting the inner face of the concave groove subsequent to the increase in the contact load can be avoided.

A fourth aspect of the present invention provides the vibration-damping device according to any one of the first to third aspects, wherein a dimension of the outer protrusion is made smaller than that of the inner protrusion in the widthwise direction of the concave groove.

According to the present aspect, abutting forces applied to the outer protrusion due to the abutment against the stopper portion can be transmitted more efficiently from the outer protrusion to the inner protrusion so that the buffer effect can be more effectively exerted based on the elastic deformation of the outer protrusion as well as the inner protrusion.

A fifth aspect of the present invention provides the vibration-damping device according to any one of the first to fourth aspects, wherein the outer protrusion comprises a plurality of linear ridges extending in the lengthwise direction of the concave groove.

According to the present aspect, it becomes possible to efficiently ensure the outer protrusion with a large free surface and a large rubber volume at the same time, thus enabling to further enhance the buffer effect exerted in cooperation between the outer protrusion and the inner protrusion.

A sixth aspect of the present invention provides the vibration-damping device according to any one of the first to fifth aspects, wherein the outer protrusion is formed with a smaller rubber volume than that of the inner protrusion.

According to the present aspect, by restricting the rubber volume of the outer protrusion, the initial spring characteristics exhibited based on the elastic deformation of the outer protrusion at the time of abutment against the stopper portion can be set soft enough, thus enabling to enhance the initial buffer function.

A seventh aspect of the present invention provides the vibration-damping device according to any one of the first to sixth aspects, wherein the outer protrusion is formed in a tapered shape.

According to the present aspect, since the outer protrusion in itself exhibits nonlinear slow-rising load-deflection characteristics, it becomes possible to adjust the buffer effect as appropriate by taking advantage of the changes in the spring characteristics subsequent to the transition from the elastic deformation of the outer protrusion to the elastic deformation of the inner protrusion as well as the changes in the spring characteristics subsequent to the increase in the amount of elastic deformation of the outer protrusion itself.

An eighth aspect of the present invention provides the vibration-damping device according to any one of the first to seventh aspects, wherein the displacement regulating portion is formed so as to expand with a nearly constant thickness dimension on the opposing face.

According to the present aspect, by having the stopper portion abutted against almost the entire surface of the displacement regulating portion that expands at a near constant thickness, localized concentration of strain and stress of the rubber buffer layer can be prevented to enhance the durability thereof.

A ninth aspect of the present invention provides the vibration-damping device according to any one of the first to eighth aspects, wherein the concave groove extends continuously across both ends of the opposing face of the at least one of the first and second stopper portions, and both lengthwise sides of the concave groove open at the respective ends of the opposing face.

According to the present aspect, it becomes possible to effectively secure the rubber volume of the inner protrusion while maintaining the free surface of the inner protrusion on both sides of the concave groove in the lengthwise direction.

A tenth aspect of the present invention provides the vibration-damping device according to any one of the first to ninth aspects, wherein an inner side bracket is attached to the first mounting member, while an outer side bracket is attached to the second mounting member so as to spacedly cover an outside of the inner side bracket, and the first and second stopper portions are constituted respectively by the inner side and outer side brackets, while the inner side bracket is provided with the concave groove and the rubber buffer layer.

According to the present aspect, since the first and second stopper portions are configured by each of the inner side and outer side brackets that are prepared separately from the first and second mounting members, the degree of freedom in designing the shape of the stopper portion can be increased, thus enabling to keep the contact area of the stopper portion large enough and facilitate the installation of the rubber buffer layer on the stopper portion, for example.

An eleventh aspect of the present invention provides the vibration-damping device according to the tenth aspect, wherein a gate-shaped member is provided to the outer side bracket so as to cover an outside of the first mounting member, while an insertion portion is provided to the inner side bracket so as to be inserted into the gate-shaped member of the outer side bracket from a lateral side and fixed to the first mounting member, and a rubber buffer member constituting the rubber buffer layer is installed on the inner side bracket in a state of covering the insertion portion.

According to the present aspect, both lateral faces of the inner side bracket in the widthwise direction are placed opposite the leg parts of the gate-shaped member of the outer side bracket to obtain a pair of stopper faces in an efficient space-saving manner. In addition, the rubber buffer member covering the inner side bracket forms the rubber buffer layer so as to cover the pair of stopper faces, which makes it easier to provide the rubber buffer layer on the inner side bracket.

Effect of the Invention

In the vibration-damping device with the structure according to the present invention, an excellent buffer effect is exhibited at the stopper mechanism by the inner protrusion with its both sides being made free surfaces in the concave groove of the stopper portion and by the outer protrusion protruding out of the concave groove, while a reliable displacement limiting effect can be exerted by the displacement regulating portion that covers the opposing face of the stopper portion away from the concave groove. This makes both the buffer function and displacement limiting function highly feasible at the same time for the stopper mechanism where the first and second stopper portions abut against each other via the rubber buffer layer.

BRIEF DESCRIPTION OF THE DRAWINGS

FIG. 1 is a longitudinal cross-section view of a vibration-damping device as a first embodiment of the present invention, representing a cross-section view taken along line 1-1 of FIG. 3.

FIG. 2 is another longitudinal cross-section view of the vibration-damping device shown in FIG. 1, representing a cross-section view taken along line 2-2 of FIG. 3.

EMBODIMENTS FOR CARRYING OUT THE INVENTION

Figure 3:
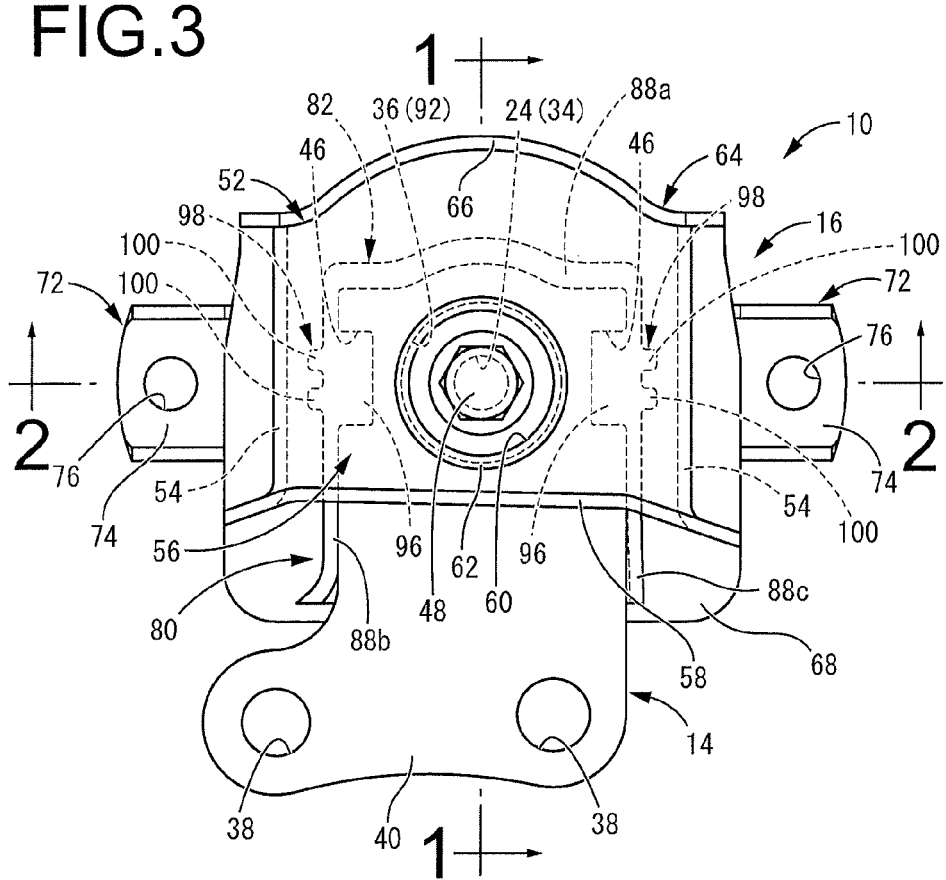
FIG. 3 is a plan view of the vibration-damping device shown in FIG. 1
Figure 4:
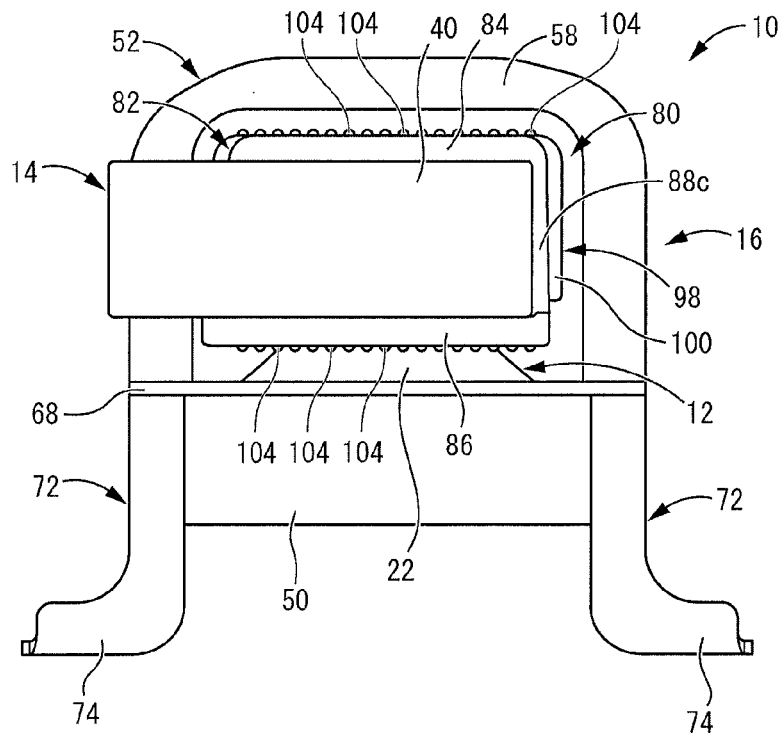
FIG. 4 is a front view of the vibration-damping device shown in FIG. 1.
Figure 5:
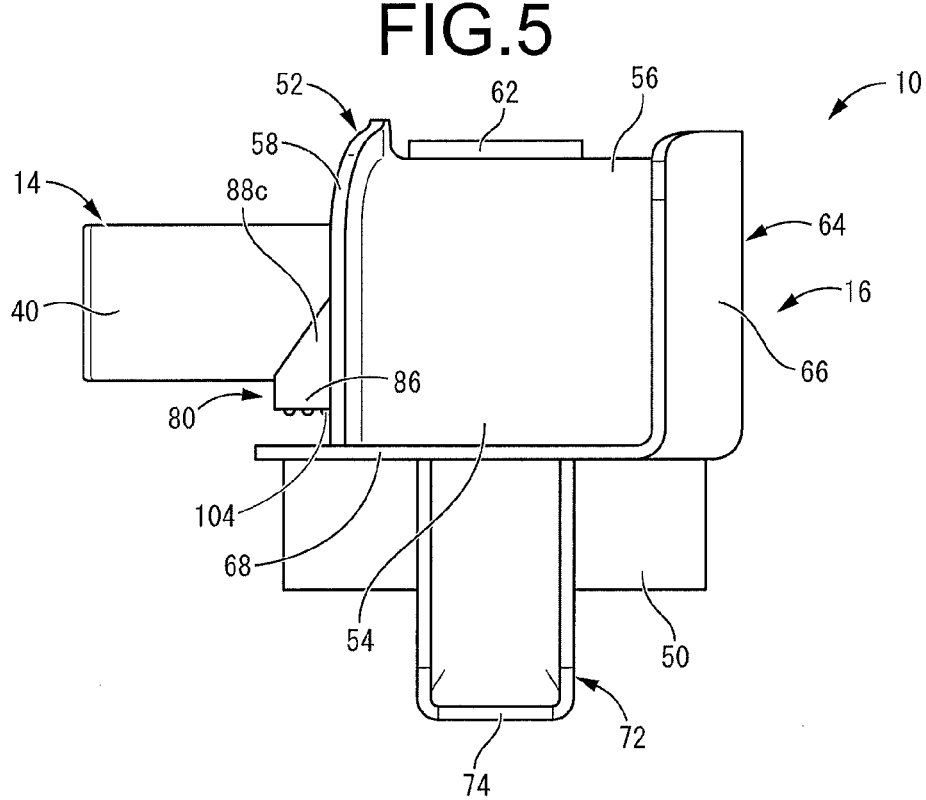
FIG. 5 is a right side view of the vibration-damping device shown in FIG. 1.
Figure 6:
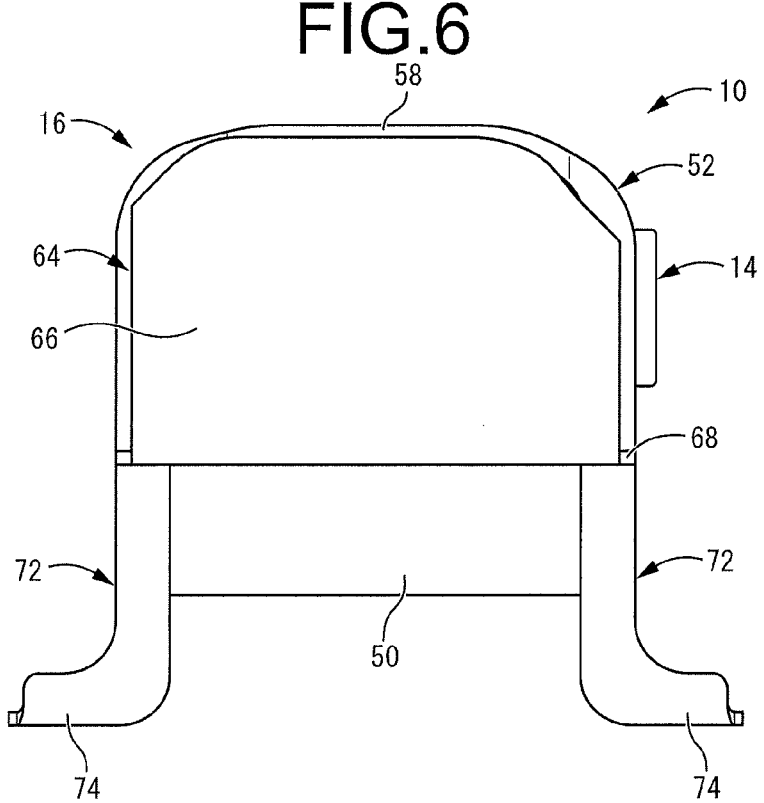
FIG. 6 is a rear view of the vibration-damping device shown in FIG. 1.

Embodiments of the present invention will be described below in reference to the drawings.

First, FIGS. 1 to 6 show an automobile engine mount 10 as a first embodiment of the vibration-damping device with the structure according to the present invention. The engine mount 10 has a structure where an inner side bracket 14 and an outer side bracket 16 are attached to a mount body 12. Then, a first mounting member 18 is mounted to the power unit via the inner side bracket 14, a second mounting member 20 is mounted to a vehicular body via the outer side bracket 16, thereby supporting the power unit by the vehicular body in a vibration damping manner. In the following descriptions, "up-down direction" means the up-down direction in FIG. 1, which approximately coincides with the vertical direction in a state of being mounted on the vehicle.

Explaining in detail, the mount body 12 has a structure where the first mounting member 18 and the second mounting member 20 are connected to each other by a main rubber elastic body 22.

Explaining in further detail, the first mounting member 18 is a high-rigidity member having an approximate shape of a circular block and formed of a metal material such as iron, aluminum alloy or the like. Also, in the midpoint of the first mounting member 18 in the radial direction, a screw hole 24 is formed extending in the up-down direction and opening to the top face. Furthermore, at the top end of the first mounting member 18, a flange 26 is integrally formed in an annular shape. Then, the top end face of the first mounting member 18 is made to include the top face of the flange 26 to make a flat outer end face 28 with a large-diameter extending in the axis-perpendicular direction of the mount body.

Meanwhile, the second mounting member 20 is made in an approximate shape of a thin and large-diameter circular cylinder and formed of a similar material to that of the first mounting member 18 having high rigidity. The bottom end of the second mounting member 20 is made into an annular bottom portion 30 that is bent toward the inner circumference.

Then, the first mounting member 18 and the second mounting member 20 are arranged in such a way that the first mounting member 18 is placed above the second mounting member 20 away therefrom being elastically connected thereto by the main rubber elastic body 22.

The main rubber elastic body 22 is made in an approximate shape of a thick, large-diameter truncated cone, and a central recess 32 is formed on the end face of the larger-diameter side thereof to open downward. Also, the first mounting member 18 is inserted into the end face of the smaller-diameter side of the main rubber elastic body 22 and bonded thereto by vulcanization, while the inner peripheral face of the second mounting member 20 is overlapped with the outer peripheral face of the large-diameter side end to be bonded thereto by vulcanization. In the present embodiment, the main rubber elastic body 22 is made into an integral vulcanization molded product provided with the first mounting member 18 and the second mounting member 20.

Figure 7:
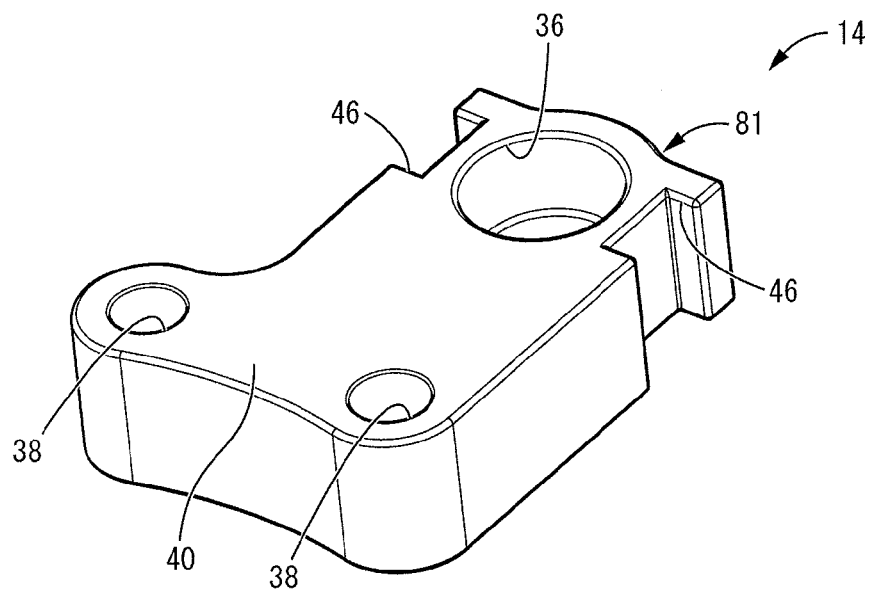
FIG. 7 is a perspective view of an inner side bracket of the vibration-damping device shown in FIG. 1.
Figure 8:
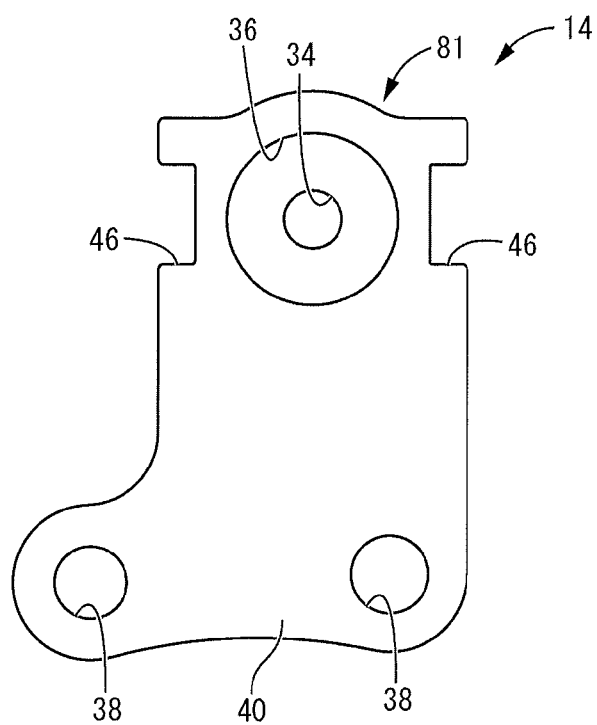
FIG. 8 is a plan view of the inner side bracket shown in FIG. 7.
Figure 9:
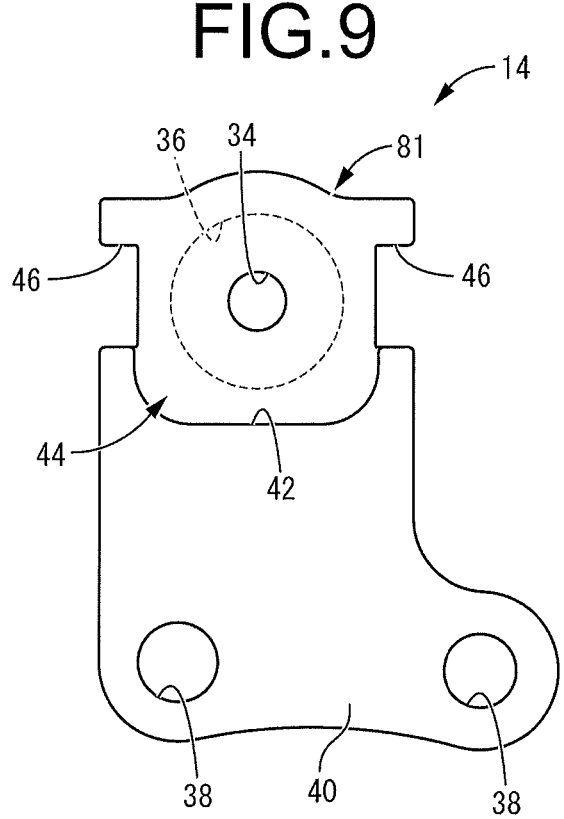
FIG. 9 is a bottom view of the inner side bracket shown in FIG. 7.
Figure 10:
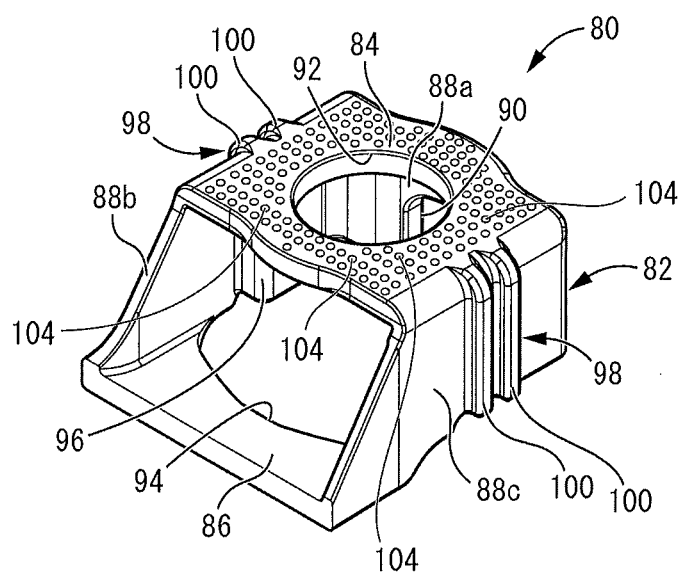
FIG. 10 is a perspective view of a rubber buffer member of the vibration-damping device shown in FIG. 1.
Figure 11:
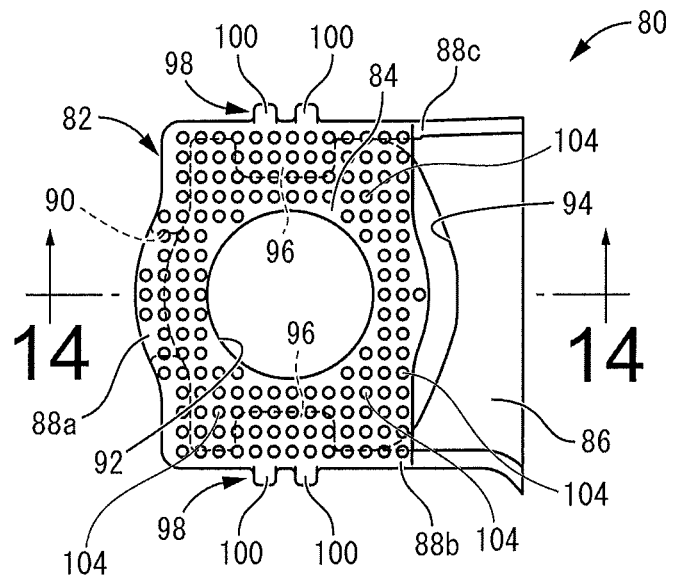
FIG. 11 is a plan view of the rubber buffer member shown in FIG. 10.
Figure 12:
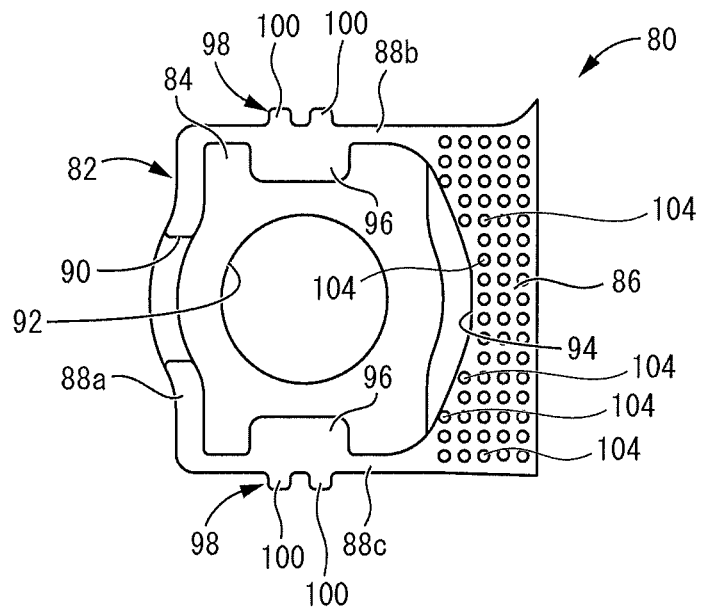
FIG. 12 is a bottom view of the rubber buffer member shown in FIG. 10.
Figure 13:
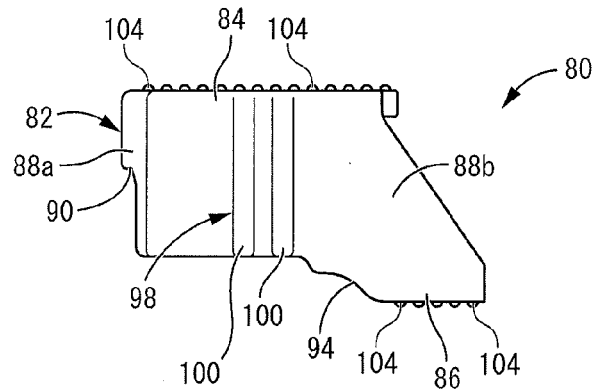
FIG. 13 is a left side view of the rubber buffer member shown in FIG. 10.
Figure 14:
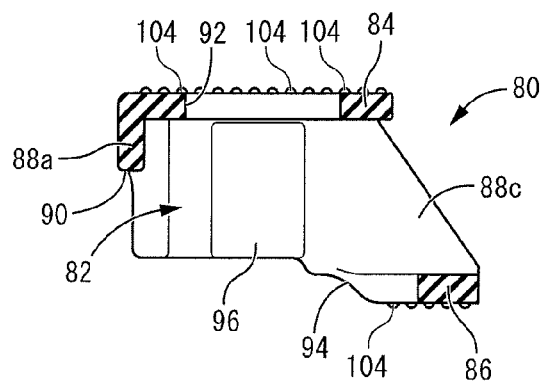
FIG. 14 is a cross-section view taken along line 14-14 of FIG. 11.
Figure 15:
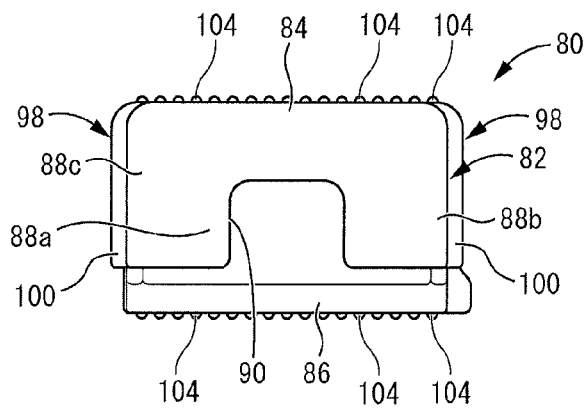
FIG. 15 is a rear view of the rubber buffer member shown in FIG. 10.

In the present embodiment, the inner side bracket 14 shown in FIGS. 7 to 9 is attached to the first mounting member 18 of the mount body 12 having the structure described above.

The inner side bracket 14 is in an approximate shape of a thick plate and a bolt hole 34 is formed on the base side (to the left in FIG. 1) that penetrates therethrough in the up-down direction. The upper opening of the bolt hole 34 is enlarged in diameter where a large-diameter recess 36 is formed to contain the bolt head. Also, bolt holes 38, 38 for mounting are formed at the tip portion of the inner side bracket 14 to make a mounting portion 40 to be mounted to the power unit. The bottom face of the inner side bracket 14 is formed with a step 42, and the base side of the step 42 is made thinner by the thickness equivalent to the height of the step 42. On this thinned part, which constitutes a base side bottom face 44, the inner side bracket 14 is overlapped with the outer end face 28 of the first mounting member 18 to be installed thereto in a state of positioning the step 42 against the outer peripheral face of the flange 26 of the first mounting member 18.

Furthermore, a concave groove 46 is formed on the outer peripheral face of the inner side bracket 14. Especially in the present embodiment, the pair of concave grooves 46, 46 are formed on both sides across the bolt hole 34 in the widthwise direction (left-right direction in FIG. 8) on the base side of the inner side bracket 14. These pair of concave grooves 46, 46 have a nearly constant width dimension (up-down dimension in FIG. 8) and a nearly constant depth (left-right dimension in FIG. 8), which are formed to extend continuously in a linear manner across the entire length in the thickness direction of the inner side bracket 14. Accordingly, both lengthwise sides of each of the concave grooves 46, 46 open to the top and bottom end faces of the inner side bracket 14.

Then, as shown in FIGS. 1 to 3, the base side of the inner side bracket 14 is fixed to the first mounting member 18 by screwing a fixing bolt 48 that is inserted through the bolt hole 34 in the inner side bracket 14 into the screw hole 24 of the first mounting member 18, and the tip side of the inner side bracket 14 extends toward one side in the axis-perpendicular direction of the mount body 12 (left-right direction in FIG. 1) to be installed therein. Then, the mounting portion 40 on the tip side of the inner side bracket 14 is mounted to the power unit by the fixing bolt inserted into the bolt hole 38.

Meanwhile, the outer side bracket 16 is attached to the second mounting member 20 of the mount body 12. As shown in FIGS. 1 to 6, the outer side bracket 16 comprises a fitting portion 50 in an approximate shape of a circular cylinder and a gate-shaped member 52 in an approximate shape of a gate, and the gate-shaped member 52 is overlapped and fixed to the fitting portion 50. Then, the outer side bracket 16 is fixed to the mount body 12 so as to let the gate-shaped member 52 cover the outside of the first mounting member 18 by press-fitting the second mounting member 20 into the fitting portion 50.

The gate-shaped member 52 has a pair of leg parts 54, 54 that are positioned opposite to each other extending nearly in the up-down direction and a beam part 56 that connects the top end of these leg parts 54, 54. Then, the gate-shaped member 52 is arranged so as to straddle over the upper opening of the fitting portion 50 in the radial direction by placing the bottom end of the pair of leg parts 54, 54 overlapped with the opposing top end faces of the fitting portion 50.

A reinforcing rib 58 is integrally formed with the gate-shaped member 52 at one of the edges thereof in the widthwise direction (left-right direction in FIG. 1) extending all across the pair of leg parts 54, 54 and the beam part 56. At the center of the beam part 56, an insertion hole 60 is formed as a service hole for the fixing bolt 48 of the inner side bracket 14. The surrounding edge of the insertion hole 60 is also provided with a reinforcing rib 62 formed in an annular shape.

Also, on the other side of the gate-shaped member 52 in the widthwise direction (left side in FIG. 1), a side wall member 64 is arranged to cover the opening of the gate-shaped member 52 toward the other side thereof in the widthwise direction. The side wall member 64, as shown in FIG. 3, has the center portion bulged outward to make a side wall 66 in a curved plate shape. In addition, the gate-shaped member 52 is provided with an abutting part 68 in a shape of an annular plate, which is directly overlapped with the top face of the fitting portion 50 all around the circumference to be fixed thereto by welding. That is, on part of the circumference of the abutting part 68 in an annular plate shape, the side wall 66 is integrally formed so as to rise from the outer periphery thereof. Then, by overlapping the abutting part 68 with the top face of the fitting portion 50, the side wall 66 is arranged so as to rise from part of the circumference of the fitting portion 50.

Furthermore, the bottom end of the leg parts 54, 54 of the gate-shaped member 52 are overlapped and fixed to the abutting part 68 of the side wall member 64, while the other side of the opening edge of the gate-shaped member 52 in the widthwise direction (left-side in FIG. 1) is overlapped and fixed to the side wall 66 of the side wall member 64. In the gate-shaped member 52 with one opening covered by the side wall member 64, the inner side bracket 14 is arranged in a state of being inserted from the other opening. In other words, the base side of the inner side bracket 14 is inserted into the one opening of the gate-shaped member 52 to be fixed by bolt to the first mounting member 18, and is assembled with the tip side of the inner side bracket 14 protruding out from the opening of the gate-shaped member 52. This allows the outer peripheral face of the inner side bracket 14 on the base side and the inner peripheral face of the gate-shaped member 52 of the outer side bracket 16 to be positioned opposite to each other so that the outside of the inner side bracket 14 is spacedly covered by the outer side bracket 16.

Moreover, a plurality of connecting members 72 are welded and fixed to the outer peripheral face of the fitting portion 50 of the outer side bracket 16 extending downward. At the bottom end of each connecting member 72, a mounting part 74 is formed, and the outer side bracket 16 is to be mounted to a vehicular body using a bolt hole 76 on each mounting part 74. As evident from the description above the outer side bracket 16, in the present embodiment, is configured by having the fitting portion 50, gate-shaped member 52, side wall member 64 and connecting member 72 fixed to each other by welding or the like.

Then, in the engine mount 10 of the present embodiment, the first stopper portion and the second stopper portion positioned opposite to each other at a given distance in the up-down direction of FIGS. 1 and 2, which is the direction of relative displacement between the first mounting member 18 and the second mounting member 20, are constituted respectively by the inner side bracket 14 and the outer side bracket 16. And, the stopper function is exerted by the abutment of the opposing faces of the inner side bracket 14 and the outer side bracket 16 against each other via the rubber buffer layer.

Figure 16:
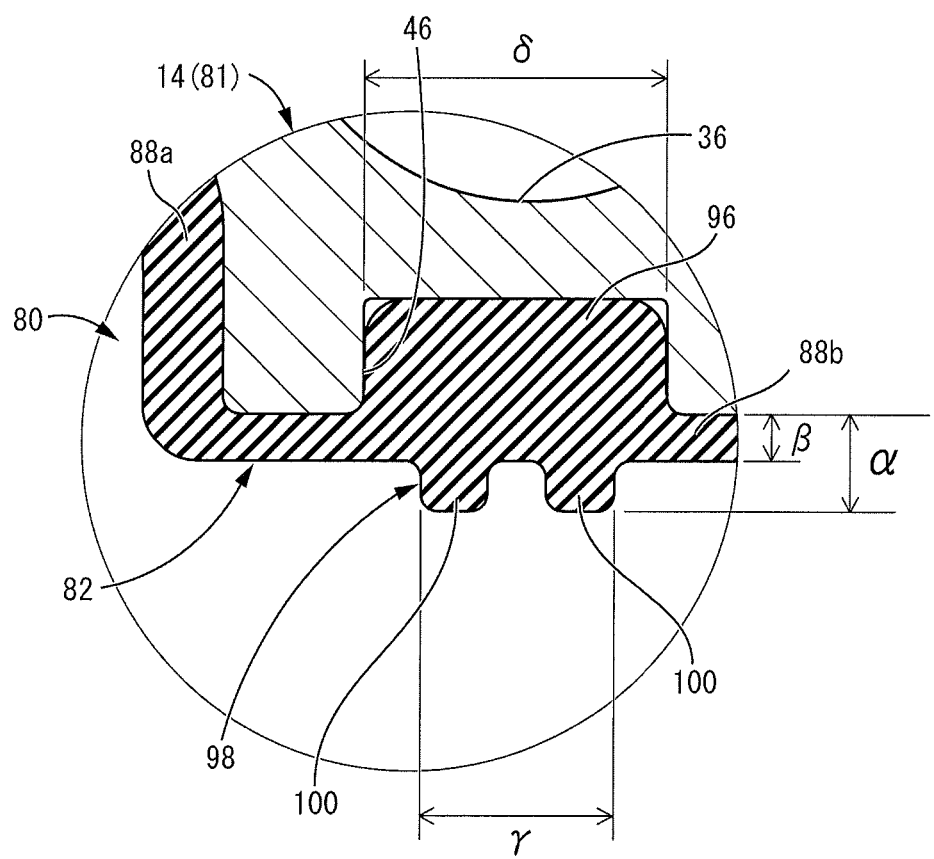
FIG. 16 is an enlarged transverse cross-section view of a principle part around the abutment between the inner side bracket and the rubber buffer member in the present embodiment.

In the present embodiment, the rubber buffer layer described above is composed of a rubber buffer member 80 attached to the inner side bracket 14. The rubber buffer member 80, as shown in FIGS. 10 to 15, is made in an approximate shape of a bag, and as shown in the enlarged view of a principle part in FIG. 16, is attached so as to cover an insertion portion 81 that is to be inserted into the outer side bracket 16, which is on the base side of the inner side bracket 14.

The rubber buffer member 80, made in an approximate shape of a hollow rectangular bag as a whole, has a peripheral wall 82 that is to be overlapped with the outer peripheral face (distal end face and both side faces) of the insertion portion 81 of the inner side bracket 14 in the circumferential direction, an upper wall 84 provided to cover the upper opening of the peripheral wall 82 to be overlapped with the top face of the insertion portion 81, and a lower wall 86 provided to cover the lower opening of the peripheral wall 82 to be overlapped with the bottom face of the insertion portion 81.

The peripheral wall 82 is composed of three side walls 88a, 88b and 88c each in an approximate shape of a plate. The side wall 88a to be overlapped with the distal end face of the insertion portion 81 is formed with a through hole 90, which functions to bleed air at the time of mounting the rubber buffer member 80 and to adjust the spring characteristics thereof. Also, on the upper wall 84, a through hole 92 is formed at a position corresponding to the large-diameter recess 36, while on the lower wall 86, an opening window 94 is formed for directly overlapping the insertion portion 81 with the first mounting member 18.

Furthermore, on each inner face of the side walls 88b, 88c of the rubber buffer member 80, an inner protrusion 96 is integrally formed so as to protrude to inside the rubber buffer member 80. Each of the inner protrusions 96, 96 has a position and shape that is allowed to be inserted into the respective one of the concave grooves 46, 46 formed in the inner side bracket 14 when the rubber buffer member 80 is mounted to the inner side bracket 14. Especially in the present embodiment, the inner protrusions 96, 96 are formed all the way from the upper wall 84 to the bottom end, and each of the inner protrusions 96, 96 is made in a shape and size to abut against each inner face of the concave grooves 46, 46 so that the inner protrusions 96, 96 can be attached to the respective concave grooves 46, 46 to fill up the space therein. Both end faces of each inner protrusion 96 in the lengthwise direction (up-down direction) of the concave groove 46 are not overlapped with the inner face of the concave groove 46 so as to be free surfaces that cannot be directly affected by restraining forces of the inner side bracket 14.

In addition, in the present embodiment, an outer protrusion 98 protruding out from the rubber buffer member 80 is formed on each of the outer faces of the side walls 88b, 88c at a position corresponding to the inner protrusion 96 on each inner face. Furthermore, on the side walls 88b, 88c of the rubber buffer member 80, the area located away from the concave groove 46 to both sides in the widthwise direction thereof is provided with a displacement regulating portion with a lower surface height than that of the distal end face of the outer protrusion 98. That is, in the present embodiment, the displacement regulating portion is configured by the area of the side walls 88b, 88c overlapped with the face on the inner side bracket 14 located away from the concave groove 46 to both sides thereof, and such displacement regulating portion is formed with a nearly constant thickness dimension.

In other words, as shown in FIG. 16, assuming the distance between the outer face of the inner side bracket 14 and the distal end face of the outer protrusion 98 to be α, and the distance between the outer face of the inner side bracket 14 and the outer face of the displacement regulating portion, that is, the thickness dimension of the side walls 88b, 88c, to be β, the inequality α>β holds.

Also, each outer protrusion 98 has its dimension γ in the widthwise direction of the concave groove 46 made smaller than the dimension δ of the inner protrusion 96 (see FIG. 16), which extends linearly along the center of the concave groove 46 in the widthwise direction with a nearly constant cross-section in the lengthwise direction. Especially in the present embodiment, the outer protrusion 98 comprises two linear ridges 100, 100 that extend in the lengthwise direction of the concave groove 46. Also, the protruding height of the linear ridge 100 is made smaller than the protruding height of the inner protrusion 96, and the outer protrusion 98 is formed with a smaller rubber volume than that of the inner protrusion 96.

In the present embodiment, a number of grain protrusions 104 are formed on the top face of the upper wall 84 and the bottom face of the lower wall 86 in the rubber buffer member 80. The grain protrusion 104, preferably made with a smaller cross-section than the linear ridge 100, is provided to reduce the striking noise at the abutment impact.

Then, the rubber buffer member 80 with the structure described above is positioned and retained under a condition of covering the insertion portion 81 of the inner side bracket 14 to be installed thereto, by having the inner protrusions 96, 96 inserted into the concave grooves 46, 46. In the present embodiment, the rubber buffer member 80 is not adhered to the inner side bracket 14 but installed thereto using the elasticity of the rubber buffer member 80.

In the engine mount 10 described above, the outer side bracket 16 and the inner side bracket 14 are arranged opposite to each other at a given distance under a condition of being mounted to a vehicle in which the shared support load of the power unit is applied to the engine mount in the up-down direction. Then, if excessive external forces such as large vibration, impact load or the like are applied to the engine mount 10 due to centrifugal forces and road inputs at the time of cornering during driving, the stopper function is expected to work in a buffering manner by having the inner side bracket 14 and the outer side bracket 16 abut against each other via the rubber buffer member 80. More specifically, when large external forces are applied in the up-down direction, for example, the stopper function in the bound direction is exerted by the abutment between the near-middle portion of the inner side bracket 14 in the lengthwise direction and the abutting part 68 of the outer side bracket 16 via the lower wall 86 of the rubber buffer member 80, while the stopper function in the rebound direction is exerted by the abutment between the insertion portion 81 of the inner side bracket 14 and the beam part 56 of the outer side bracket 16 via the upper wall 84 of the rubber buffer member 80.

Furthermore, when large external forces are applied in the left-right direction of FIG. 2, the stopper function is exerted in the front-rear direction of the vehicle for example, due to the abutment between the insertion portion 81 of the inner side bracket 14 and the leg part 54 of the outer side bracket 16 via the side walls 88b, 88c of the rubber buffer member 80.

Here, the inner protrusion 96 and the outer protrusion 98 are formed on the side wall 88b/88c of the rubber buffer member 80, and a significant rubber volume is ensured by cooperation between the inner and outer protrusions 96, 98, while a free surface on both sides of the inner protrusion 96 in the lengthwise direction is secured so that the degree of freedom in deformation is favorably given to compressive deformation between the abutting faces in the pressure-contact direction. This activates significant functions of energy absorption and attenuation, thus enabling to obtain an excellent buffer effect due to soft spring characteristics. Especially, since the outer protrusion 98 with a smaller cross-section than that of the inner protrusion 96 is first brought in contact with the opposing face, the spring characteristics in the initial stage of contact can be made soft enough, thereby mitigating the striking noise and impact at the initial contact more effectively.

Moreover, on the rubber buffer member 80, the area outside the concave groove 46 on both sides thereof is made to be a displacement regulating portion, and if larger external forces than those of the load range where only the stopper function by the aforementioned inner and outer protrusions 96, 98 is exerted, relative displacement between the power unit and the vehicular body can surely be restricted by abutting the inner side bracket 14 against the outer side bracket 16 via the displacement regulating portion made thinner than the inner and outer protrusions 96, 98.

Especially in the present embodiment, since the rubber buffer member 80 is installed to the inner side bracket 14 in an non-adhesive manner, the buffer effect of the rubber buffer member 80 can be exerted more effectively in the various stopper functions described above under a condition of high durability.

Also, in the present embodiment, since the inner protrusion 96 is abutted against the bottom face of the concave groove 46 to be assembled thereto from the beginning, abnormal noise and impact caused by the inner protrusion 96 hitting against the bottom face of the concave groove 46 can be avoided when the stopper function is activated.

Figure 17:
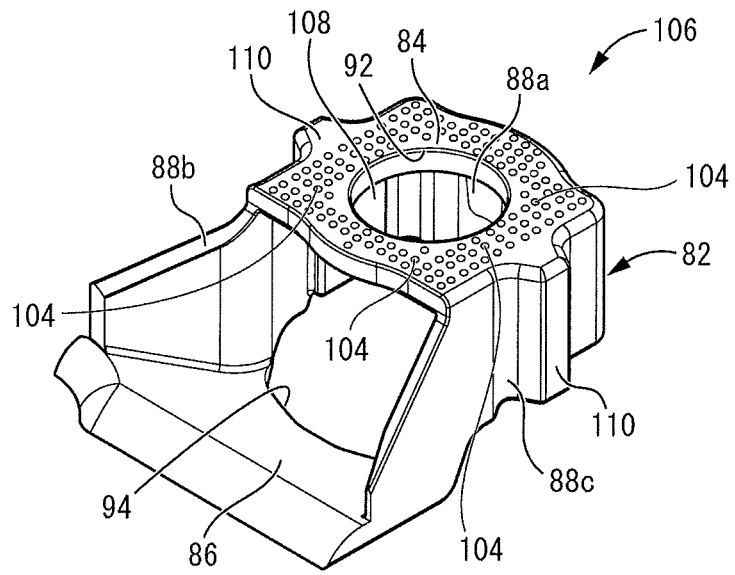
FIG. 17 is a perspective view of a rubber buffer member of a vibration-damping device as a second embodiment of the present invention.
Figure 18:
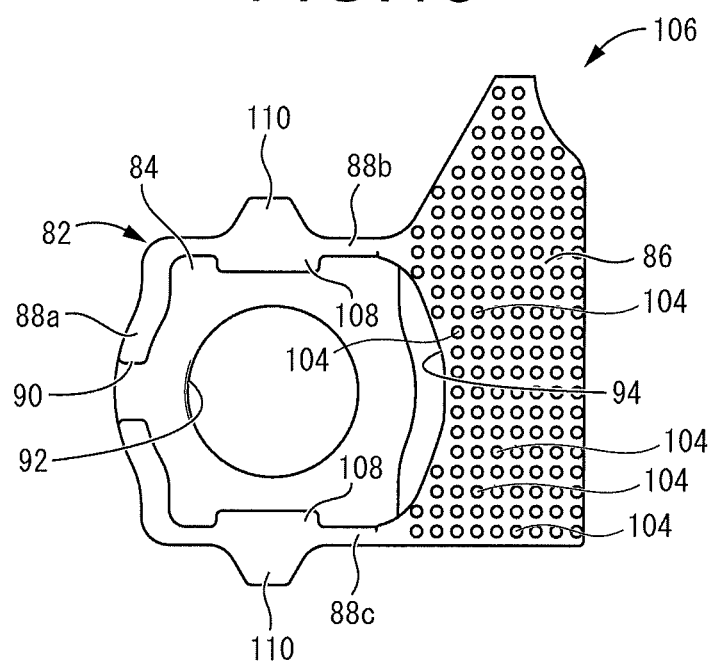
FIG. 18 is a bottom view of the rubber buffer member shown in FIG. 17.
Figure 19:
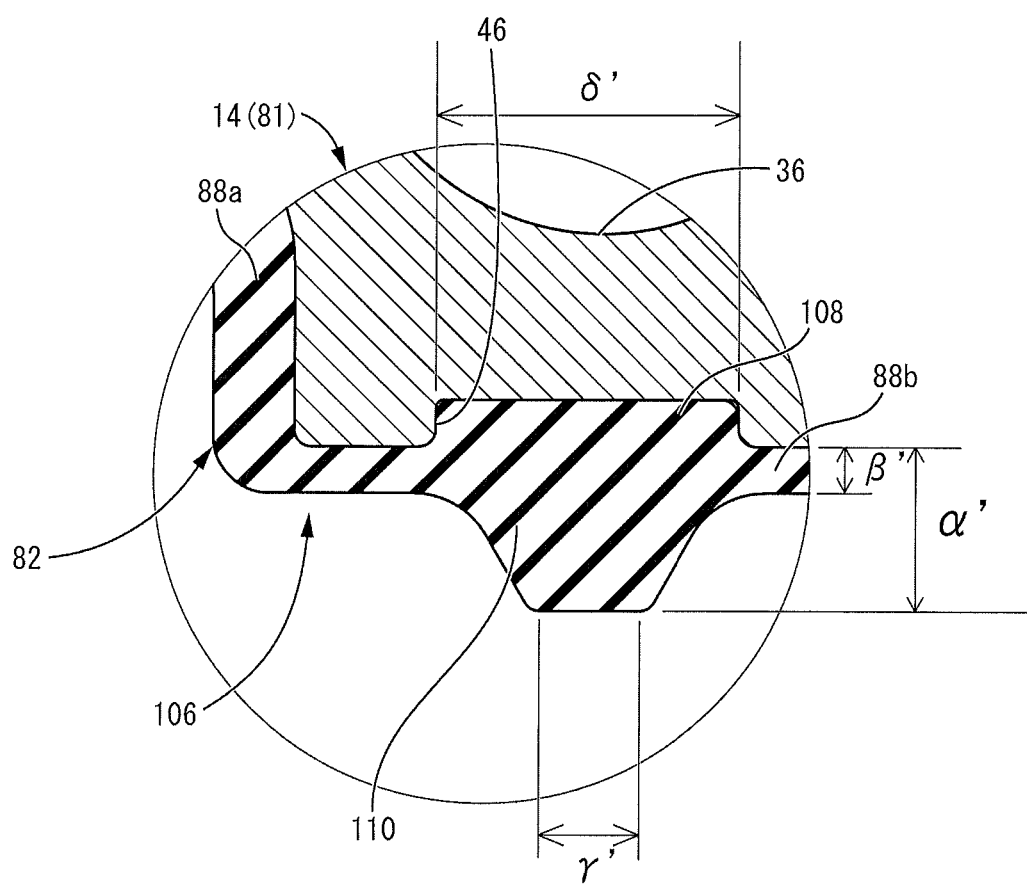
FIG. 19 is an enlarged transverse cross-section view of a principle part around the abutment between the inner side bracket and the rubber buffer member in the present embodiment.

Next, FIGS. 17 and 18 show a rubber buffer member 106 that constitutes an engine mount as a vibration-damping device of a second embodiment of the present invention. In addition, FIG. 19 shows an enlarged view of a principle part of the assembly between the rubber buffer member 106 and the inner side bracket 14. Since the basic structure of the engine mount of the present embodiment is the same as that of the first embodiment, the figures only show the rubber buffer member 106. Also, detailed description of the members and portions identical to those of the first embodiment are omitted by allocating the same reference numerals as those of the first embodiment in the figures.

Also in the present embodiment, an inner protrusion 108 is formed on each inner face of the side walls 88b and 88c of the rubber buffer member 106, while an outer protrusion 110 is formed at positions corresponding to the inner protrusion 108 on each outer face of the side walls 88b, 88c. In the present embodiment, the outer protrusion 110 is made as one linear ridge extending in the lengthwise direction of the concave groove 46. The outer protrusion 110 is tapered on both sides in the widthwise direction with an approximate trapezoidal cross-section extending from the side walls 88b, 88c. Therefore, the outer protrusion 110 of the present embodiment is formed in a tapered shape with its width dimension gradually reducing from the base toward the tip end.

Under these circumstances, as to the outer protrusion 110 of the present embodiment as shown in FIG. 19, assuming the distance between the outer face of the inner side bracket 14 and the distal end face of the outer protrusion 110 to be $\alpha'$, and the distance between the outer face of the inner side bracket 14 and the outer face of the displacement regulating portion, that is, the thickness dimension of the side walls 88b, 88c, to be $\beta'$, the inequality $\alpha' > \beta'$ holds. In addition, the tip width dimension $\gamma'$ of the outer protrusion 110 is made smaller than the width dimension $\delta'$ of the inner protrusion 108 and the concave groove 46. The width dimension of the base side of the outer protrusion 110 is made substantially smaller than the width dimension of the inner protrusion 108 and is formed in a size and position that can fit in the concave groove 46. Also, the protruding height of the outer protrusion 110 is made larger than that of the inner protrusion 108.

In the present embodiment, as is the case with the first embodiment, an excellent buffer function can be obtained based on the elastic deformation of the inner protrusion 108 and the outer protrusion 110, and the same effect as in the first embodiment can be achieved using the rubber buffer member 106 of the present embodiment, and therefore, various effects similar to those of the first embodiment can be produced in the engine mount of the present embodiment that adopts the rubber buffer member 106.

Embodiments of the present invention have been described in detail above, but the present invention is not limited to those specific descriptions. For example, in one of the previous embodiments, the concave groove 46 has open ends on both sides in the lengthwise direction. However, even if the concave groove 46 itself is not open in the lengthwise direction, end faces having free surfaces can be formed within the concave groove 46 by having the inner protrusion that is inserted into the concave groove made in a length short of reaching the end faces of the concave groove 46 in the lengthwise direction.

Also, it is possible to give the inner or outer protrusion of the rubber buffer layer a structure with variable heights in the lengthwise direction of the concave groove, or to make it composed of a plurality of protrusions independent from each other in the lengthwise direction of the concave groove, which can ensure the degree of freedom in tuning the stopper functions to meet the required characteristics. In addition, it is also possible to form the inner protrusion with a plurality of linear ridges extending in the lengthwise direction of the concave groove, or to form the outer protrusion with three or more linear ridges extending in the same direction.

Furthermore, in the embodiments described above, aspects of the engine mount were shown as a vibration-damping device relating to the present invention, but the vibration-damping device relating to the present invention is not limited to the engine mount but also can be applied to the body mount, suspension support, sub-frame mount and so forth. Also, specific shapes of the inner side bracket and the outer side bracket are not limited to those of the embodiments described above, and it is also possible to configure the outer side bracket, for example without providing the side wall member 64. Moreover, the inner side bracket and the outer side bracket are not essential in the present invention, and it is possible to directly provide the first or second mounting member with the first or second stopper portion.

In addition, it is also possible to configure the stopper mechanism in the up-down direction with a different member from that of the stopper mechanism in the widthwise direction (front-rear direction of the vehicle in the embodiments described above).

KEYS TO SYMBOLS

10: Engine mount (vibration-damping device); 14: Inner side bracket; 16: Outer side bracket; 18: First mounting member; 20: Second mounting member; 22: Main rubber elastic body; 46: Concave groove; 80, 106: Rubber buffer member (rubber buffer layer); 81: Insertion portion; 88*b*, 88*c*: Side wall (displacement regulating portion); 96, 108: Inner protrusion; 110: Outer protrusion; 100: Linear ridge.

The invention claimed is:

1. A vibration-damping device comprising:
   first and second mounting members;
   a main rubber elastic body connecting the first and second mounting members to each other;
   first and second stopper portions arranged opposite to each other in a direction of relative displacement of the first and second mounting members;
   a rubber buffer layer via which the first and second stopper portions abut against each other;
   a concave groove being provided on an opposing face of at least one of the first and second stopper portions to another;
   an inner protrusion being formed on the rubber buffer layer overlapped with the opposing face so as to be inserted into the concave groove, both end faces of the inner protrusion in a lengthwise direction of the concave groove being free end faces;
   an outer protrusion being formed at a formation part of the inner protrusion on the rubber buffer layer so as to protrude outward from the concave groove; and
   a displacement regulating portion with a lower surface height than that of a distal end face of the outer protrusion, the displacement regulating portion being provided on the rubber buffer layer and covering an area of the opposing face located away from the concave groove to both sides of the concave groove in a widthwise direction of the concave groove.

2. The vibration-damping device according to claim 1, wherein the rubber buffer layer is overlapped with the at least one of the first and second stopper portions in a non-adhesive manner at least at the inner protrusion.

3. The vibration-damping device according to claim 1, wherein the inner protrusion abuts against an inner face of the concave groove.

4. The vibration-damping device according to claim 1, wherein a dimension of the outer protrusion is made smaller than that of the inner protrusion in the widthwise direction of the concave groove.

5. The vibration-damping device according to claim 1, wherein the outer protrusion comprises a plurality of linear ridges extending in the lengthwise direction of the concave groove.

6. The vibration-damping device according to claim 1, wherein the outer protrusion is formed with a smaller rubber volume than that of the inner protrusion.

7. The vibration-damping device according to claim 1, wherein the outer protrusion is formed in a tapered shape.

8. The vibration-damping device according to claim 1, wherein the displacement regulating portion is formed so as to expand with a constant thickness dimension on the opposing face.

9. The vibration-damping device according to claim 1, wherein the concave groove extends continuously across both ends of the opposing face of the at least one of the first and second stopper portions, and both lengthwise sides of the concave groove open at the both ends of the opposing face.

10. The vibration-damping device according to claim 1, further comprising: an inner side bracket being attached to the first mounting member; and an outer side bracket being attached to the second mounting member so as to spacedly cover an outside of the inner side bracket, wherein the first stopper portion is constituted by the inner side bracket and the second stopper portion is constituted by the outer side bracket, while the inner side bracket includes the concave groove and the rubber buffer layer.

11. The vibration-damping device according to claim 10, wherein the outer side bracket includes a gate-shaped member so as to cover an outside of the first mounting member, and the inner side bracket includes an insertion portion,
   the insertion portion of the inner side bracket is located within the gate-shaped member of the outer side bracket, and
   the rubber buffer layer is constituted by a rubber buffer member, and is installed on the inner side bracket while covering the insertion portion.

* * * * *